United States Patent [19]

Moline

[11] 3,975,297

[45] Aug. 17, 1976

[54] PROCESS OF PREPARING FREE-FLOWING ANTIOZONANT BLENDS

[75] Inventor: Donald F. Moline, Akron, Ohio

[73] Assignee: The Goodyear Tire & Rubber Company, Akron, Ohio

[22] Filed: Mar. 11, 1974

[21] Appl. No.: 450,136

[52] U.S. Cl. .................. 252/400 R; 260/45.9 R; 252/401
[51] Int. Cl.² ................. C09K 15/16; C08K 5/16
[58] Field of Search ............. 252/401, 400 R, 426, 252/428, 384; 260/45.9 R

[56] References Cited

UNITED STATES PATENTS

| 3,247,161 | 4/1966 | Cox | 260/45.9 QB |
|---|---|---|---|
| 3,304,284 | 2/1967 | Cox | 252/401 |
| 3,304,285 | 2/1967 | Cox | 252/401 |
| 3,384,614 | 5/1968 | Rosenwald | 252/401 |
| 3,424,713 | 1/1969 | Oberster | 252/401 |
| 3,502,615 | 3/1970 | Rosenwald | 252/401 |
| 3,507,826 | 4/1970 | Lal | 252/401 |
| 3,530,076 | 9/1970 | Sparks | 252/401 |
| 3,542,692 | 11/1970 | Spaent | 252/401 |
| 3,674,705 | 7/1972 | Hytrek | 252/401 |
| 3,785,995 | 1/1974 | Kalil | 252/401 |

OTHER PUBLICATIONS

Encyclopedia of Polymer Science and Technology 1965, vol. No. 2, pp. 197–203.

*Primary Examiner*—Benjamin R. Padgett
*Assistant Examiner*—Donald P. Walsh
*Attorney, Agent, or Firm*—F. W. Brunner; J. A. Rozmajzl

[57] ABSTRACT

A mixture of diaryl-p-phenylenediamines is added in solid form to a partially crystallized melt of N-1,3-dimethylbutyl,N'-phenyl-p-phenylenediamine, and the crystallization completed to form a free-flowing antiozonant blend. Other rubber additives can be substituted for the amine mixture.

7 Claims, No Drawings

PROCESS OF PREPARING FREE-FLOWING ANTIOZONANT BLENDS

This invention relates to a method of preparing a solid antiozonant composition which can be used in a dry, free-flowing, relatively homogeneous, flaked form.

Flaked forms of rubber additives are frequently preferred for ease of handling by those who compound rubber. It is desirable that these flaked forms be non-tacky and dry as well as relatively homogeneous (if a blend) and free-flowing. Easy to handle blends of compounding ingredients (rubber additives) are desirable since they eliminate separate handling of the components. Both N-1,3-dimethylbutyl, N'-phenyl-p-phenylenediamine (HPPD) and a mixture of amines prepared by reacting aniline and o-toluidene with hydroquinone are well known commercial antiozonants. The amine mixture and related mixtures will be referred to herein as ATH. The HPPD is well known for its short term antiozonant protection and the ATH for its long term antiozonant protection. A blend of said compositions naturally results in an antiozonant composition which offers both long term and short term antiozonant protection.

It is an object of the present invention to provide easy to handle blends of HPPD with other rubber additives. It is also an object of the present invention to provide a solid blend of HPPD and ATH capable of being used in a dry, non-tacky, easy to handle, free-flowing, relatively homogeneous, flaked form. It is another object of the present invention to provide a process of preparing such blends. Other objects will become apparent as the description proceeds.

The objects of the present invention are accomplished by melting the HPPD, partially crystallizing the melt by lowering the temperature under agitation to a temperature below the melting point of the rubber additive to be blended with the HPPD, e.g., the ATH, adding the rubber additive in solid form, and completing the crystallization of the HPPD. The resultant blend is a non-tacky solid, easy to handle, dry, relatively homogeneous and capable of being flaked into a free-flowing composition by conventional flaking techniques.

A general, but not limiting procedure which can be used to prepare the blend involves melting the HPPD by raising its temperature above its melt point (at least 55° C.) and then cooling slowly to a temperature of about 30° C. to 35° C. under agitation, normally vigorous in nature. The lowering of the temperature combined with the agitation will initiate crystallization of the HPPD. When about 50 percent of the HPPD is crystallized from the melt, the solid rubber additive is added with agitation at a temperature below the melting point of the additive. The addition of the solid rubber additive is completed by the time 70 percent of the crystallization has occurred. The crystallization can then be continued until complete.

The resultant blend can be flaked according to standard techniques to provide the flaked version of the blend. Preferably when the addition of the solid rubber additive is complete and the percent crystallization of the HPPD is less than about 70 percent, the blend is flaked, preferably with agitation, while the crystallization is completed.

The flaking is best done on a conventional, continuous, belt flaker equipped with a conditioning roll. The blend is fed to the flaker behind the conditioning roll which is temperature controlled at the melt point of the HPPD or approximately 45° C. The conditioning roll not only provides additional agitation to the blend, but also spreads the mass into a thin sheet or flake.

The blends are prepared in a weight ratio of from 15:100 to 50:100 of solid rubber additive to HPPD, preferably 20:100 to 40:100.

The ATH contains three major components; N,N'-diphenyl-p-phenylenediamine (DPPD); N,N-diorthotolyl-p-phenylenediamine (DTPD) and N-phenyl-N'-orthotolyl-p-phenylenediamine (PTPD). Although there are normally 15 to 20 percent of other products in the ATH mixture, the amount of the three major components per 100 parts by weight of the major components will range from one to 35 parts of DPPD (preferably 5 to 35 parts), 15 to 90 parts of DTPD (preferably 15 to 60 parts) and 10 to 50 parts of PTPD (preferably 35 to 50 parts).

The present liquid/solid blending technique is superior to a liquid/liquid technique since many rubber additives have melting points so high as to be prohibitive, for example, zinc oxide. In addition, even those which have lower melting points require the extra melting step. In addition, the use of the rubber additive as a liquid would tend to hinder the crystallization of the HPPD.

The present blending technique is superior to the solid/solid technique since the present technique guarantees blend uniformity.

The present liquid/solid crystallization approach overcomes a special problem associated with the preparation of a HPPD/ATH blend. If a liquid/liquid approach is used (both HPPD and ATH in molten form) a eutectic blend of the materials results which is still a liquid at room temperature and lower. The resultant crystallized product is therefore a sticky material which is difficult to handle.

The only limitation on the solid rubber additive to be combined with the HPPD in the practice of the present invention is that it possess a melting point above 45° C. and is not appreciably soluble in the HPPD at the level it is used with the HPPD. The solid rubber additives are all well known in the art and include antioxidants, antiozonants, scorch inhibitors, sulfur, zinc oxide, carbon black, accelerators for the sulfur vulcanization of rubber, etc.

The degree of HPPD crystallization as regards the addition of the solid rubber additive is important, as disclosed earlier herein. If the solid rubber additive is added before sufficient crystallization has occurred, then the crystallization can be hindered. The possibility of eutectic blend formation with the ATH also exists. If the addition of the additive occurs too late in the crystallization, the blend uniformity can suffer. In addition, a lumpy blend which is not easily flaked can be formed.

A direct measurement of the percent crystallization is quite difficult since any attempt to separate the liquor from the crystals at the proper point for flaking would result in inaccuracies due to the crystallization rate and the likelihood that filter papers could totally plug. Centrifuging would probably result in a solid mass. Therefore it has been found that the indirect determination of percent crystallization based on the heat capacity of the HPPD and its heat of crystallization and the cooling rate (e.g., as measured by inlet and outlet cooling water temperatures and the quantity of cooling water) is probably the best method of measuring, theoretically, the degree of crystallization.

The following examples 1 to 7 illustrate but are not intended to limit the present invention.

EXAMPLE 1

One hundred fifty grams of HPPD were melted and then cooled slowly to 30° C. with agitation. Crystallization began and was allowed to continue until approximately 50 percent crystallized. Fifty grams of solid ATH in small particles were added all at once and blended for about 20 seconds. The blend was poured out on an aluminum sheet and spread with a heated metal bar at 45° C. The blend solidified completely within 30 seconds.

EXAMPLE 2

One hundred fifty grams of molten HPPD were agitated and cooled to 30° C. to induce crystallization. Fifty grams of stearic acid were added when about 50 percent of the HPPD had crystallized, and agitated into the HPPD for 20 seconds. The blend was poured out and spread with a heated bar at 60° C. The blend solidified within 30 seconds.

EXAMPLE 3

Example 2 was repeated substituting a processing wax for the stearic acid.

EXAMPLE 4

Example 2 was repeated substituting sulfur for the stearic acid.

EXAMPLE 5

Example 2 was repeated substituting 52.5 grams of 2-(morpholinodithio)-benzothiazole and 7.5 grams of tetramethylthiuram monosulfide for the stearic acid.

EXAMPLE 6

One hundred forty grams of molten HPPD were processed into the partially crystallized state described in Example 2. Sixty grams of carbon black were added and the blend processed as described in Example 2.

EXAMPLE 7

Example 6 was repeated substituting 2-(morpholinodithio)-benzothiazole for the carbon black.

The products of Examples 1 to 7 were all dry, solid, homogeneous blends capable of being flaked into easy to handle, free-flowing form.

To illustrate the fact that the ratio of rubber additive to HPPD is important, it should be noted that when 70 grams of 2-(morpholinodithio)-benzothiazole were added to 130 grams of partially crystallized HPPD, the resultant blend became too thick to remove from the container and solidified totally in a rapid manner in the container.

The solid rubber additives should be added as small particles, e.g., in ground form. Otherwise, naturally, blend uniformity will suffer.

While certain representative embodiments and details have been shown for the purpose of illustrating the invention, it will be apparent to those skilled in this art that various changes and modifications may be made therein without departing from the spirit or scope of the invention.

I claim:
1. A process of preparing a dry, homogeneous, solid blend of an antiozonant and a rubber additive comprising
   A. crystallizing molten N-1,3-dimethylbutyl-N'-phenyl-p-phenylenediamine until 50 percent to 70 percent has been crystallized,
   B. adding a solid rubber additive having a melting point exceeding 45° C. to the partially crystallized molten amine at a temperature below the melting point of the rubber additive,
   C. completing the addition of the rubber additive before in excess of 70% crystallization has occurred, and
   D. completing the crystallization, wherein the weight ratio of rubber additive to amine is from 15:100 to 50:100.
2. The process according to claim 1 wherein the solid rubber additive is a solid mixture of diaryl-p-phenylenediamines, said mixture comprising 1 to 35 parts by weight of N,N'-diphenyl-p-phenylenediamine, 15 to 90 parts of N,N'-di-o-tolyl-p-phenylenediamine and 10 to 50 parts of N-phenyl-N'-o-tolyl-p-phenylenediamine, all parts being parts by weight per 100 parts by weight of the three diaryl-p-phenylenediamines.
3. The process according to claim 2 wherein the mixture of diaryl-p-phenylenediamines comprises 5 to 35 parts by weight of N,N'-diphenyl-p-phenylenediamine, 15 to 60 parts of N,N'-di-o-tolyl-p-phenylenediamine and 35 to 50 parts of N-phenyl-N'-o-tolyl-p-phenylenediamine, all parts being parts by weight per 100 parts by weight of the three diaryl-p-phenylenediamines.
4. The process of claim 1, wherein the weight ratio of rubber additive to amine is from 20:100 to 40:100.
5. The process of claim 1 wherein the completely crystallized blend is flaked.
6. The blend prepared according to claim 1.
7. A process according to claim 1 wherein the solid rubber additive is selected from the group consisting of antioxidants, antiozonants, scorch inhibitors, sulfur, zinc oxide, carbon black, accelerators for the sulfur vulcanization of rubber, and processing waxes.

* * * * *